(12) United States Patent
Elsmark et al.

(10) Patent No.: US 9,718,176 B2
(45) Date of Patent: Aug. 1, 2017

(54) REGULATOR FOR A POWER TOOL

(75) Inventors: Karl Johan Lars Elsmark, Saltsjö-Boo (SE); Henric Per Johan Jöngren, Stockholm (SE)

(73) Assignee: ATLAS COPCO INDUSTRIAL TECHNIQUE AKTIEBOLAG, Stockholm (SE)

( * ) Notice: Subject to any disclaimer, the term of this patent is extended or adjusted under 35 U.S.C. 154(b) by 1019 days.

(21) Appl. No.: 12/668,182

(22) PCT Filed: Jul. 10, 2008

(86) PCT No.: PCT/SE2008/000443
§ 371 (c)(1),
(2), (4) Date: Jan. 27, 2010

(87) PCT Pub. No.: WO2009/011633
PCT Pub. Date: Jan. 22, 2009

(65) Prior Publication Data
US 2010/0206598 A1    Aug. 19, 2010

(30) Foreign Application Priority Data
Jul. 13, 2007 (SE) .................................... 0701727

(51) Int. Cl.
| B25B 23/14 | (2006.01) |
| B25B 27/00 | (2006.01) |
| B23P 19/06 | (2006.01) |
| B21J 15/26 | (2006.01) |
| B21J 15/28 | (2006.01) |

(52) U.S. Cl.
CPC ............... *B25B 23/14* (2013.01); *B21J 15/26* (2013.01); *B21J 15/285* (2013.01); *B23P 19/066* (2013.01); *B25B 27/0014* (2013.01)

(58) Field of Classification Search
CPC ...................................................... B25B 23/14
USPC .......... 173/171, 176, 180, 181, 183; 73/761, 73/862.23
See application file for complete search history.

(56) References Cited

U.S. PATENT DOCUMENTS 3,978,385 A * 8/1976 Stroezel ....................... 388/835
4,013,895 A * 3/1977 Akiyoshi et al. ............ 307/126
(Continued)

FOREIGN PATENT DOCUMENTS

DE    3247618 A1    7/1984
EP    0 264 034 A2    4/1988
(Continued)

OTHER PUBLICATIONS

English Language International Search Report dated Nov. 25, 2008 issued in parent Appln. No. PCT/SE2008/000443.

*Primary Examiner* — Nathaniel Chukwurah
(74) *Attorney, Agent, or Firm* — Holtz, Holtz & Volek PC

(57) ABSTRACT

A regulator for a power tool for tightening a fastener in order to unite two or more pieces into a joint. The regulator regulates the power tool when tightening the fastener such that the fastener is tightened to a predetermined target. The regulator calculates an output signal to the power tool, which output signal is based on the product of the torque exerted by the power tool on the fastener and the angle for turning the fastener about its axis. The output signal is used for tightening the fastener to the predetermined target. The regulator is also applicable to a power tool for a rivet joint.

8 Claims, 9 Drawing Sheets

(56) References Cited

U.S. PATENT DOCUMENTS

| | | | | |
|---|---|---|---|---|
| 4,554,980 | A | * | 11/1985 | Doniwa ........................ 173/176 |
| 4,685,050 | A | * | 8/1987 | Polzer et al. .................... 700/32 |
| 4,709,182 | A | * | 11/1987 | Wenske et al. .......... 310/316.01 |
| 4,961,035 | A | * | 10/1990 | Inaba et al. .................... 318/600 |
| 4,969,105 | A | * | 11/1990 | Gaenssle ..................... 700/275 |
| 4,995,145 | A | * | 2/1991 | Eshghy ...................... 29/407.03 |
| 5,105,519 | A | * | 4/1992 | Doniwa ..................... 29/407.02 |
| 5,215,270 | A | * | 6/1993 | Udocon et al. ............ 29/407.02 |
| 5,353,882 | A | * | 10/1994 | Inoue et al. ................... 173/176 |
| 5,613,823 | A | * | 3/1997 | Bayne .......................... 414/408 |
| 5,650,574 | A | * | 7/1997 | Sato et al. ................. 73/862.23 |
| 6,371,218 | B1 | * | 4/2002 | Amano et al. ................ 173/183 |
| 6,516,896 | B1 | * | 2/2003 | Bookshar et al. ................ 173/1 |
| 6,668,212 | B2 | * | 12/2003 | Colangelo et al. ........... 700/275 |
| 6,981,311 | B2 | | 1/2006 | Seith et al. |
| 2005/0247459 | A1 | * | 11/2005 | Voigt et al. ........................ 173/1 |
| 2005/0279197 | A1 | * | 12/2005 | Wottreng et al. ............... 81/469 |

FOREIGN PATENT DOCUMENTS

| | | |
|---|---|---|
| EP | 1 454 713 A2 | 9/2004 |
| FR | 2 543 041 A1 | 9/1984 |
| GB | 2 098 528 A | 11/1982 |
| SU | 1754313 A1 | 8/1992 |

\* cited by examiner

REGULATOR FOR A POWER TOOL

This application is a U.S. National Phase Application under 35 USC 371 of International Application PCT/SE2008/000443 filed Jul. 13, 2008.

BACKGROUND OF THE INVENTION

Field of the Invention

The present invention relates to a regulator for fasteners, such as screws, bolts and rivets.

Description of the Related Art

When arranging a screw or a bolt, provided with a thread into a hole with a corresponding thread, a tool, such an electric wrench may be used. The screw or bolt has to be tightened to a predetermined torque in order to achieve a rigid joint. In mass production e.g. automobile production, when a large number of screws or bolts are to be applied, it is important that the screws or bolts are tightened to a predetermined torque in a short period of time.

In order to achieve the predetermined torque within a short time period a regulator is connected to the tool to regulate the tool.

A known regulator, which is used when tightening fasteners, is the PID regulator. Such a PID regulator gives an output signal u(t) according to:

$$u(t) = K_P * e(t) + K_I \int e(t)dt + K_D \frac{d}{dt} e(t) \quad (f1)$$

e(t) is the deviation in the output signal and is received from a reaction in the system. A large value of $K_P$ leads to an increased rapidity of the regulator, but also to a decreased stability. The value of $K_I$ eliminates stationary errors in the output signal, but will decrease the stability if too large. Derivation, by using a proper value of $K_D$ will increase the stability. However, it is often connected to difficulties to find a proper value of $K_D$, especially when the noise level of the output signal is high. The values of $K_P$, $K_I$ and $K_D$ are chosen from general theory and are known for the skilled person.

However, one drawback using a PID regulator is that it is difficult to reach an acceptable torque within such a short period of time, since there has to be enough time left for compensation by $K_I$ and $K_D$. As a result, the efficiency will decrease and therefore heat develops in the tool. Also, the load or strain on the power tool will increase due to large acceleration forces and variations in the current to the motor, which leads to low endurance of the tool and poor ergonomics for an operator handling the tool.

BRIEF SUMMARY OF THE INVENTION

An objective problem to be solved by the present invention is to achieve a regulator which increases the efficiency when tightening a fastener.

Another objective problem to be solved by the present invention is to provide a regulator for a power tool which accurately tightens a fastener to a predetermined torque or force at a minimum of time.

Yet another objective problem to be solved by the present invention is to improve the ergonomics for an operator handling a tool for tightening fasteners.

Another objective problem to be solved by the present invention is to decrease the load or strain on a power tool for tightening a fastener.

This is achieved by a regulator according to an aspect of the present invention.

The above mentioned objectives are obtained by using the energy contributions within the system in order to regulate the instantaneous motor current, yielding a motor torque, to obtain the target torque value. By using the kinetic energy for tightening the fastener and to control the power tool using the current to the motor of the power tool, a specific amount of energy, corresponding to a predetermined torque, is achieved in the fastener, thereby improving the tightening properties with respect to some of the parameters time, efficiency, load or ergonomics.

Time

To achieve a correct target torque value the motor has to be braked to zero speed at the point of target torque. By allowing high speed as long as possible, i.e. brake as late as possible, the time to target torque is minimized.

Efficiency.

By exploiting the kinetic energy of the motor 7 and gear 8, the motor energy is adjusted so that no excessive energy is used. As a result, a very small amount of energy is transformed into heat and combined with short time the total power consumption is decreased.

Load

Since a substantially linear torque is developed when tightening the fastener and since the current regulated for braking the motor is smooth and at a low level, the acceleration forces and the torque on the power tool will not fluctuate in a range which is critical for endurance of the components, such as gears, in the tool. Also, in favorable conditions the torque from the motor on the gears can be minimized.

Ergonomics.

Since a very small amount of energy is transformed into heat in the tool, ergonomics for an operator handling the tool improves. A minimization of the tightening time leads to a shorter torque build up time, and hence a smaller tool displacement. This results in better ergonomics on hard joints.

Due to low energy losses and a low fluctuation of the output signal from the regulator small deviations from the predetermined torque is achieved. This is due to using a regulator which is based on the laws of physics. The needed amount of motor torque for reaching the predetermined torque is calculated continuously during the tightening and as a result the accurate brake current will be used even though the characteristics of the fastener changes.

Other advantages and features of the invention can be derived from the following detailed description of exemplary embodiments of the invention, with reference to the drawings.

DETAILED DESCRIPTION OF THE INVENTION

Figure 1:
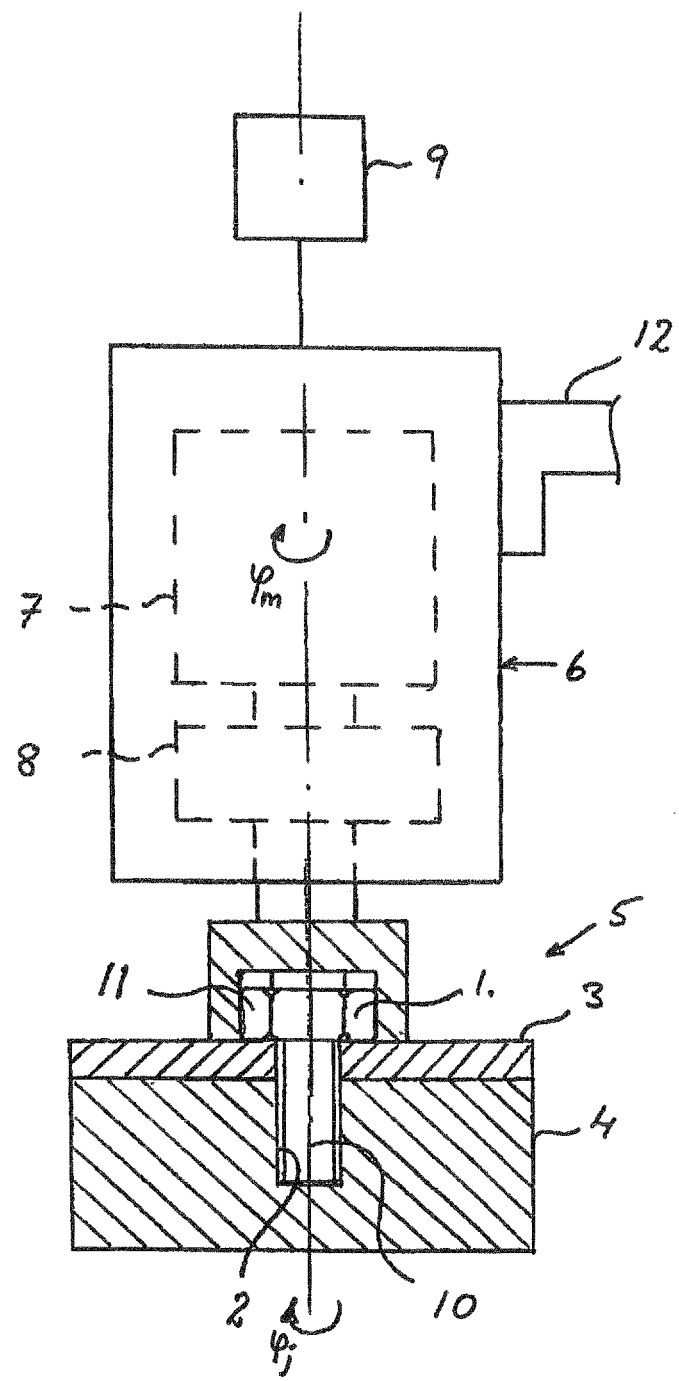
FIG. 1 is a schematic, partly sectioned view of a tool for tightening a fastener, which tool is connected to a regulator.

Referring first to FIG. 1, there is illustrated a fastener 1, which may be a screw or a threaded bolt which is fastened into an internally threaded hole 2 or into a threaded nut (not shown) to unite two or more pieces 3, 4 into a typically rigid part called a joint 5. The fastener 1 is connected to a tool 6, such as an electric wrench, which is provided with an electrical motor 7 and gear 8. The tool 6 is connected to a regulator 9, which regulates the tool 6 when tightening the fastener 1 by turning the fastener 1 at an angle φ about its axis 10. In the figure the fastener 1 is a screw or bolt provided with a head 11, which in the tightened position is arranged on one of the two pieces 3, 4. The fastener 1 may also be a threaded nut which is tightened on a threaded pin (not shown). The tool may also be a riveting tool, for which the target torque $T_{target}$ is replace by target force $F_{target}$ and the angle φ by traveled distance δ, respectively. The tool 6 may be arranged on a robot arm (not shown) or held by an operator 12.

Figure 2:
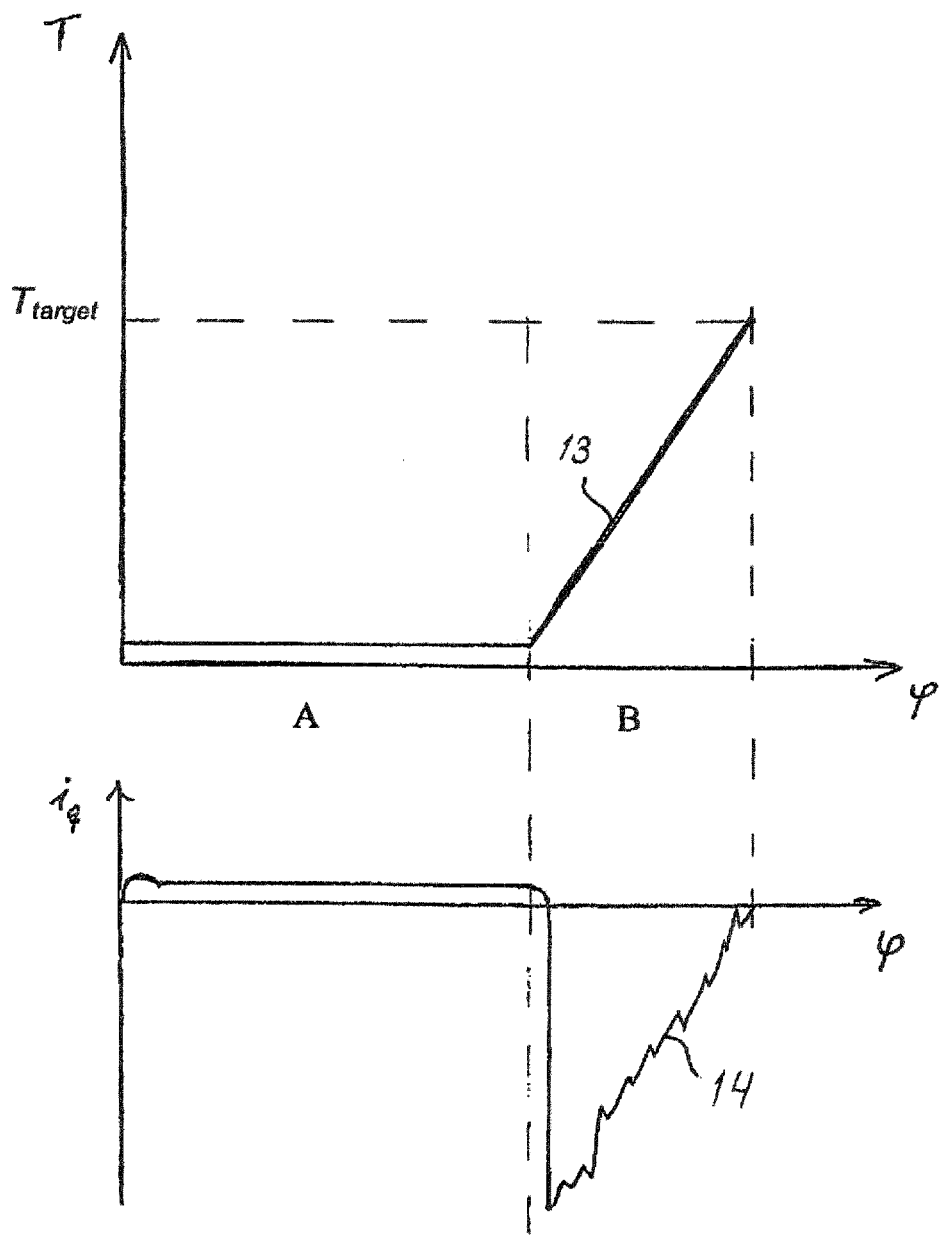
FIG. 2 shows a diagram of tightening a fastener using a PID regulator according to prior art, FIG. 3 also shows a diagram of tightening a fastener using a PID regulator according to prior art.

Referring now to FIG. 2, there is illustrated a diagram of tightening a fastener 1 using a PID regulator according to prior art. The PID regulator is well known by the skilled person. The curve 13 in FIG. 2 represents the typical torque load which is developed during the continuous threading of the fastener 1 at an angle φ about the axis 10. In the torque load curve 13 there is a free running period A where only a small torque is required to advance the fastener 1. This is followed by a period B of clamping the head 11 of the fastener 1 against the piece 3 where the pieces 3, 4 are being brought toward engagement and where the torque increases substantially linear. The period B ends when a predetermined torque target is reached.

In FIG. 2 also the current curve 14 is disclosed as $i_q$ as a function of the angle φ. In order to reach the target torque $T_{target}$, the current $i_q$ to the electrical motor 7 is regulated according to the current curve 14 by using the known PID regulator. In period A only a small current $i_q$ is required to run the motor. However, due to inertia in the electrical motor 7, the motor 7 must be provided with a control current in period B. According to FIG. 2 the control current in period B is a brake current, which brakes the motor 7. The brake current regulated by the PID regulator may fluctuate as disclosed in FIG. 2. The fluctuation and the high peak of the brake current leads to high loads or strain on the tool 6, especially the gear 8 of the tool 6, which in turn leads to low endurance of the tool and poor ergonomics for the operator 12 handling the tool.

Figure 3:
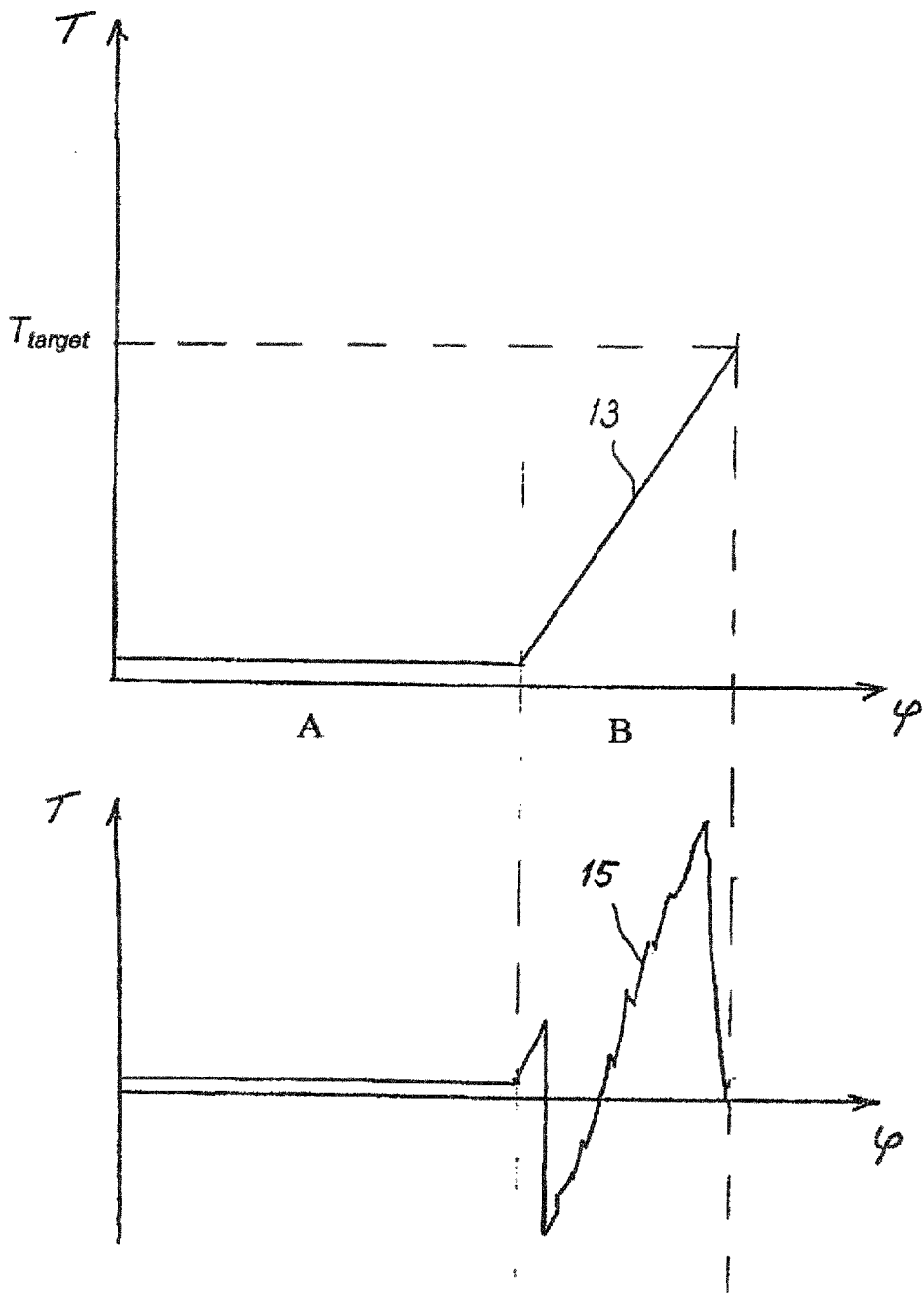

In FIG. 3 a torque load curve 15 exerted on the tool 6 is disclosed when using the known PID regulator. As is evident from FIG. 3 the torque load exerted on the tool 6 fluctuates heavily during period B.

The above-mentioned drawbacks in relation to a PID regulator are reduced or eliminated if the PID regulator is further developed.

Figure 4:
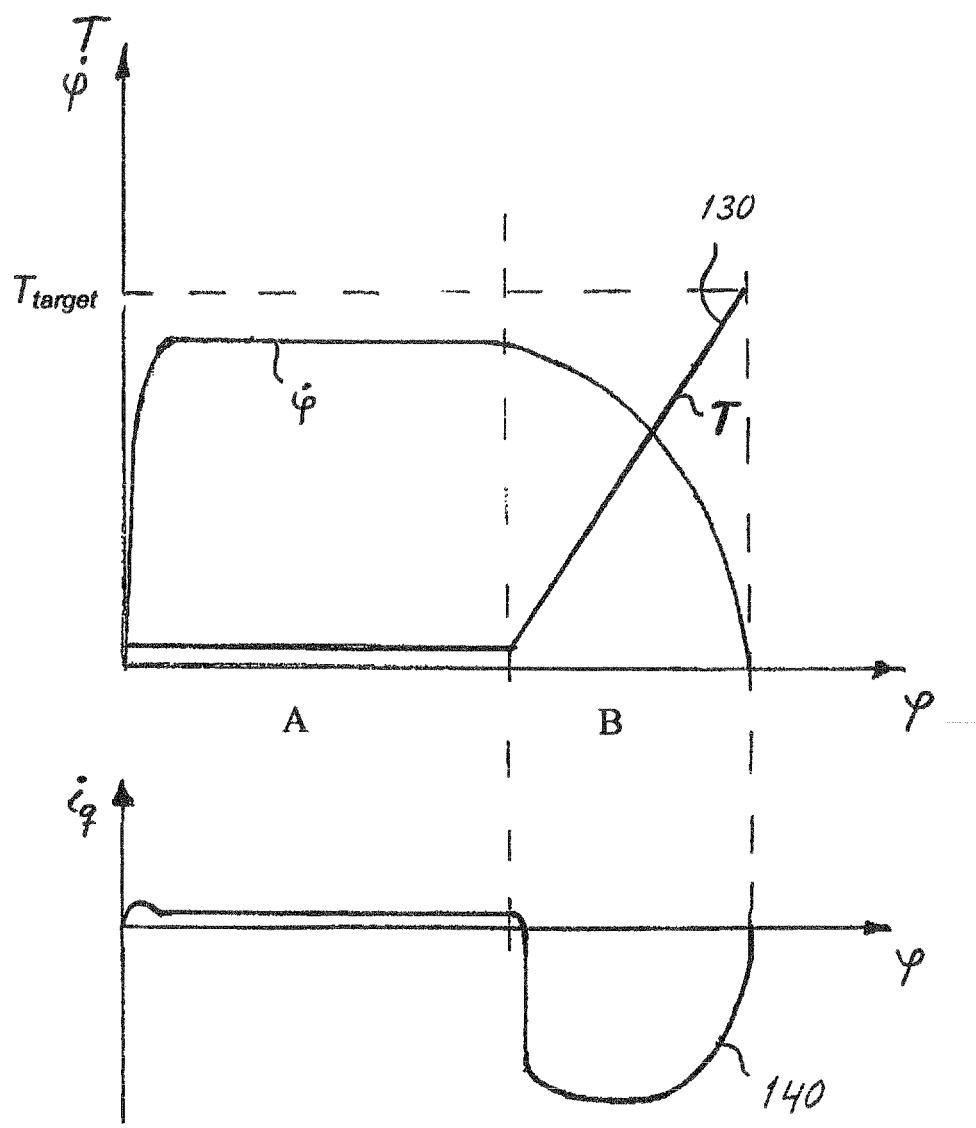
FIG. 4 shows a diagram of tightening a fastener using a regulator according to the present invention.

FIG. 4 shows a diagram of tightening a fastener using a regulator 9 according to the present invention. In FIG. 4 the typical torque load curve 130 as described in connection to FIG. 2 is disclosed. Also, the speed of rotation φ̇ is disclosed as a function of the angle φ in the diagram of FIG. 4. In the beginning of period A the speed of rotation φ̇ increases rapidly to a substantially constant level. When reaching the beginning of period B the speed of rotation φ̇ decreases as a result of increased torque and braking current provided to the motor 7. When a predetermined target torque $T_{target}$ is reached the rotation of the motor 7 stops and thus the speed of rotation φ̇ is zero as indicated in FIG. 4.

Figure 5:
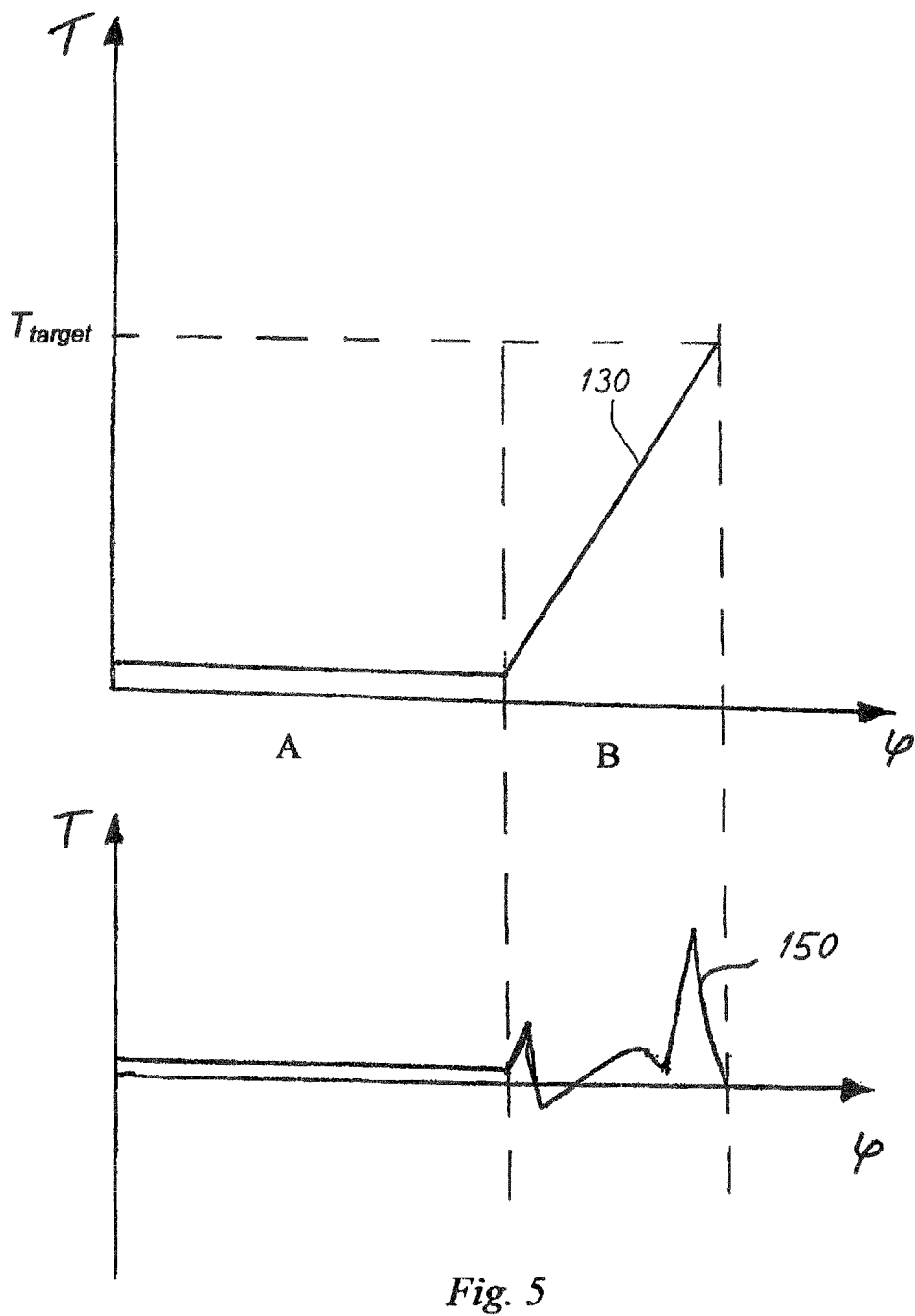
FIG. 5 shows a diagram of tightening a fastener using a regulator according to the present invention.

In FIG. 4 also the current curve 140 is disclosed as a function of the angle φ. In order to reach the target torque $T_{target}$, the current $i_q$ to the electrical motor 7 is regulated according to the current curve 140 by using the inventive regulator 9. As described in connection to FIG. 2 only a small current $i_q$ is required to run the motor in period A. However, due to inertia in the electrical motor 7, the motor 7 must be provided with a control current in period B. According to the embodiment disclosed in FIG. 4 the control current in period B is a brake current, which brakes the motor 7. The brake current regulated by the inventive regulator follows the curve 140 as disclosed in FIG. 4. The current regulated for braking the motor 7 is smooth and lower peak value relative to solutions described in prior art, the acceleration forces and the torque on the tool 6 will therefore not fluctuate in a range which is critical for endurance of the components, such as the gear 8, in the tool. This is evident from FIG. 5 in which a torque load curve 150 exerted on the tool 6 is disclosed when using the inventive regulator 9. As is evident from FIG. 5 the torque load exerted on the tool 6 fluctuates less and has a lower peak value during period B when comparing to the torque load exerted on the tool 6 using a known PID regulator.

Figure 6:
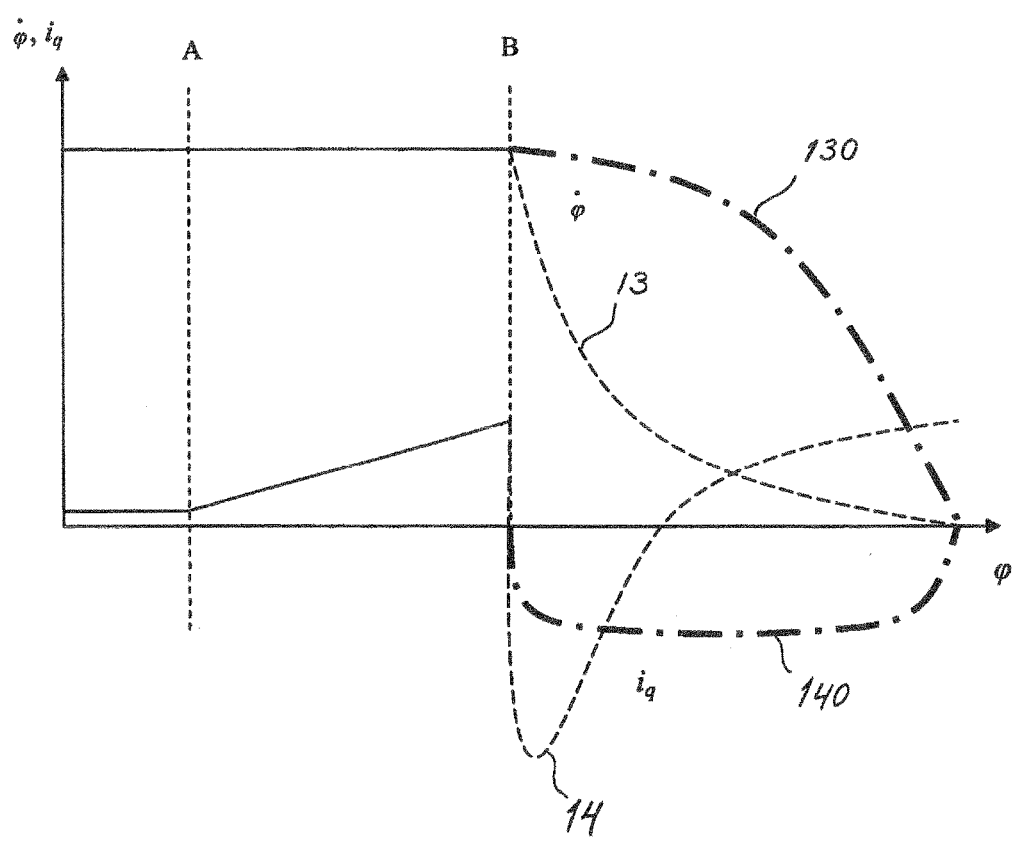
FIG. 6 shows a diagram of tightening a fastener using the conventional PID regulator and a regulator according to the present invention.

In FIG. 6 the current curve 14, 140 is disclosed as $i_q$, φ as a function of the angle φ and shows the difference between the conventional tightening using a PID regulator and the tightening method according to the invention. In order to reach the target torque $T_{target}$, the current $i_q$ to the electrical motor 7 is regulated according to the current curve 140 by using the inventive regulator 9. As described in connection to FIG. 2 only a small current $i_q$ is required to run the motor in period A. The amplitude of the brake current curve 140 is smaller when compared with the brake current curve 14 using the PID regulator for the same tightening speed counted from the start of the braking period B. Due to the fact that the braking can be initiated in at a later point, the time for tightening will be reduced. High current peak levels generate high power consumption while a more smooth current profile with a lower amplitude gives increased efficiency. The current regulated for braking the motor 7 using the inventive regulator 9 is smooth and at a lower level, and so the acceleration forces and the torque on the tool 6 will therefore not fluctuate in a range which is critical for endurance of the components, such as the gear 8, in the tool.

Figure 7:
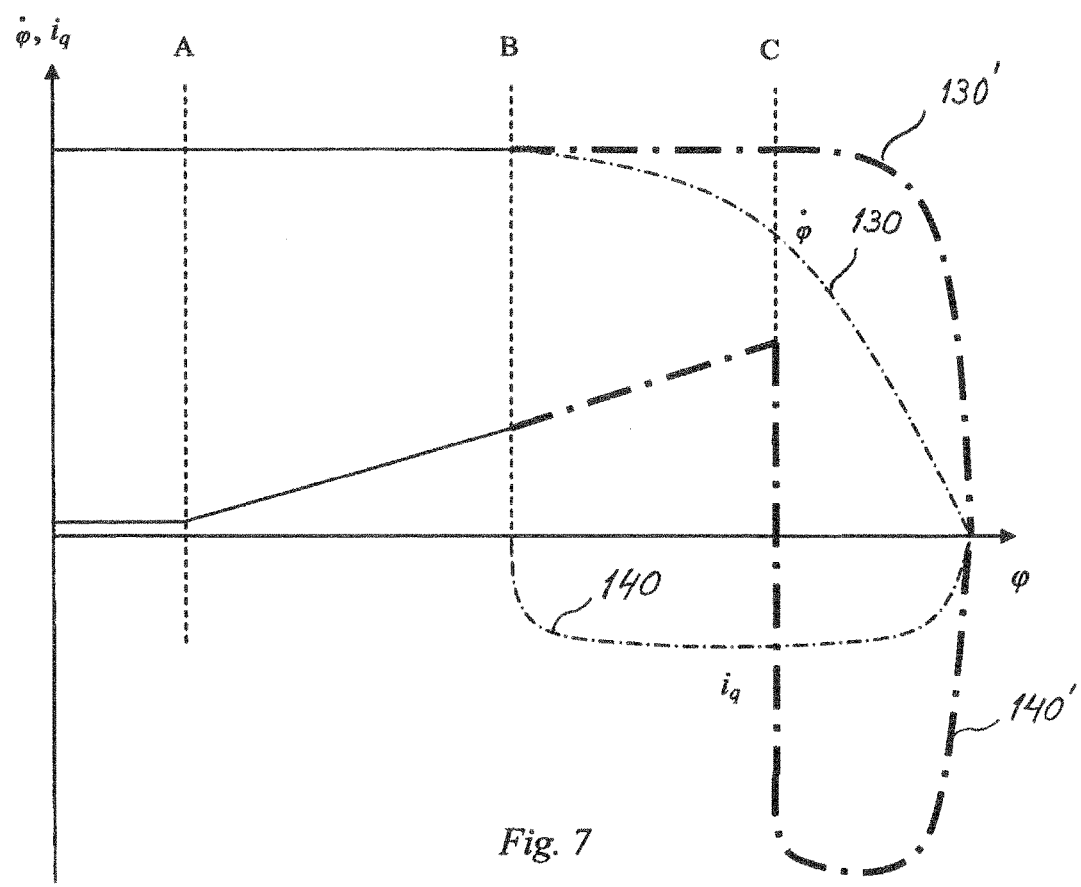
FIG. 7 shows a diagram of alternative tightening scenarios for tightening a fastener using the inventive regulator, FIG. 8 also shows a diagram of tightening a fastener using a regulator according to the present invention.

In FIG. 7 the current curve 140, 140' is disclosed as $i_q$,φ̇ as a function of the angle φ and shows a diagram of alternative tightening scenarios for tightening a fastener using the inventive regulator method. The inventive regulator gives the possibility to initiate the braking at different stages in the tightening period depending on how much brake current is accepted. In first alternative speed is maintained until braking is initiated in point B as described in FIG. 6, obtaining a tightening time that is similar as for the PID regulator. However the braking current 140 is more smooth and will consume less energy in total.

The second alternative describes a tightening where the tightening time is chosen as the most important property. By accepting a relative high braking current 140' it is possible to initiate the braking at a later point in time (compare brake points B versus C), which shortens the time frame from snug level to the Torque target level. Since the correct braking current is calculated in each time step, even though not used before the brake point, it is a matter of configuration when braking should be initiated. The configuration occurs when the calculated braking current $i_q$ exceeds a preset transition to braking threshold value, $i_q > i_{qmax}$, where $i_{qmax}$ is a configuration parameter. During ideal conditions the brake current $i_q$ will be at a constant level throughout the braking until target torque as shown in FIG. 7. That is $i_q = i_{qmax}$. This is a consequence of the formulation of energy contributions in the system and the definition of $i_q$ (f7) as described later on.

Figure 8:
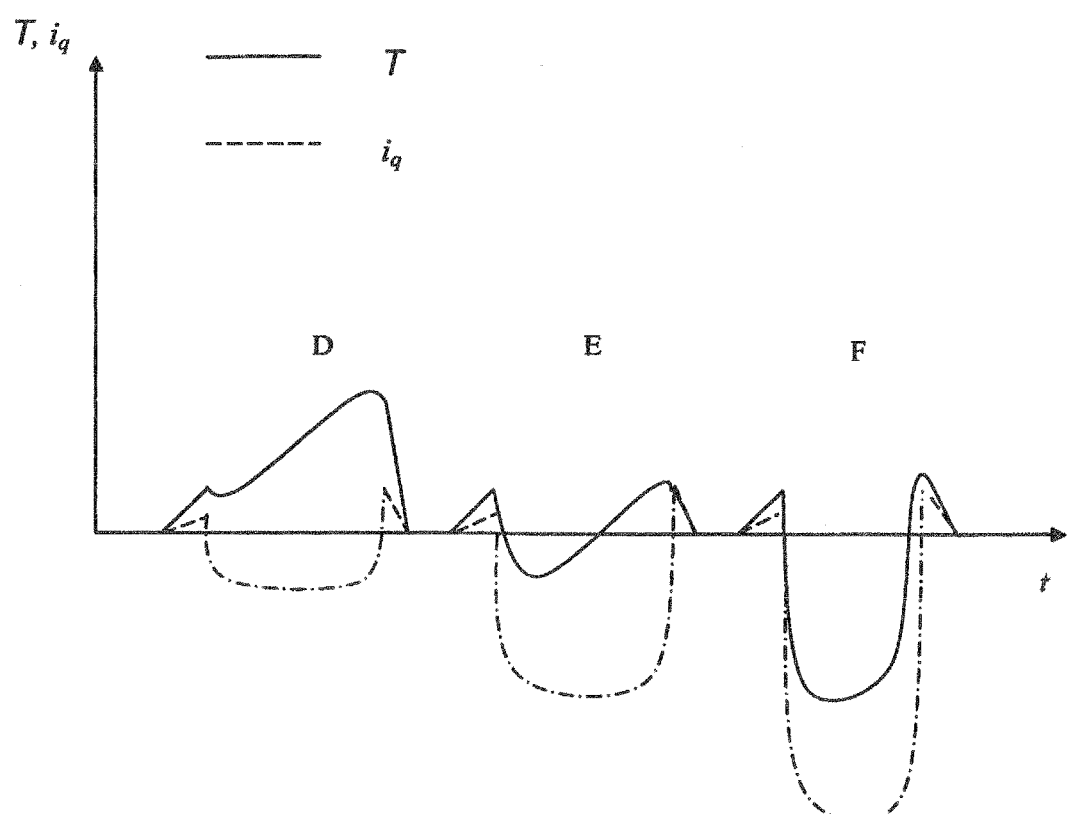

FIG. 8 discloses the brake current $i_q$ and the torque load T acting on the gears as a function of time t and shows the properties of different tightening scenarios related to tightening speed which could be chosen by the operator using the inventive regulator. If the tightening time is non critical it is possible to choose a tightening process wherein the brake current is smooth and in which case the applied torque load T acting on the gears can be minimized during said braking. This will also spare the gearings in the system. The curves should be interpreted as follows:

The braking current $i_q$ is relatively small and as a result, a substantial positive torque is acting on the gears during tightening D, while a large braking current results in situation where a substantial negative torque is acting on the gears during tightening F. Using a favourable braking current as in tightening E the resulting torque on the gears can be minimized. In other words, the torque transferred to the gears from the motor is minimized using a correct brake current.

Figure 9:
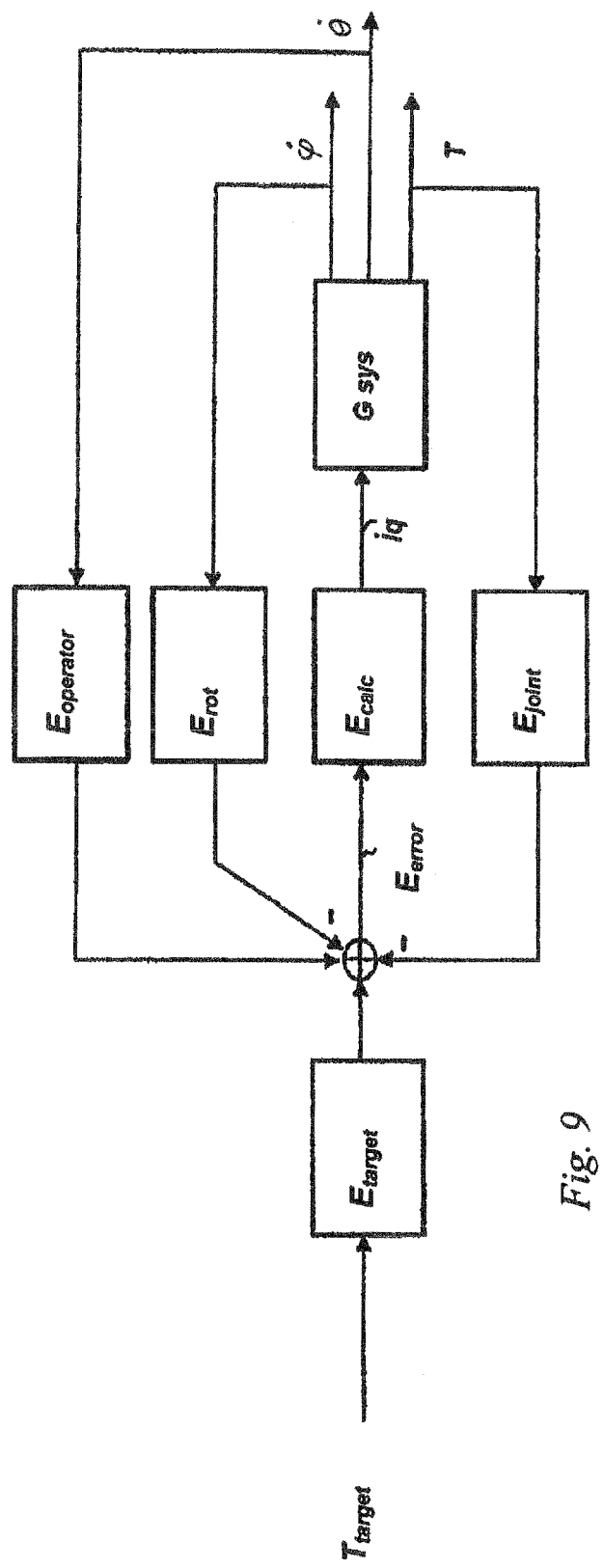
FIG. 9 shows a block scheme of a regulator according to the present invention.

According to FIG. 9 the regulator 9 calculates an output signal $i_q$ achieved from the calculation step $E_{calc}$ by taking in account the energy contributions within the system. These are the calculated or predetermined target energy $E_{target}$ the kinetic rotational energy $E_{rot}$ in the motor 7 and in the gear 8, the potential joint energy $E_{joint}$ in the joint 5 and the operator energy $E_{operator}$ from the operator 12.

From the relationships above and from the block scheme of FIG. 9 it follows that:

$$E_{error} = E_{target} + E_{operator} - E_{joint} - E_{rot} \quad \text{(f2)}$$

The energy $E_{error}$ is the amount of energy the motor 7 in the tool 6 should add in order to reach the torque target. According to f2 it is defined as the sum of the above-mentioned energy contributions.

$E_{operator}$ is the result of the mass of inertia of the operator using the tool but also the mass of inertia from the tool. The operator may also use an active reaction force. In a rigid or hard joint the influence of $E_{operator}$ is smaller when comparing to more flexible or soft joints, since the time for clamping the joint up to the target torque is longer for soft joints than for hard joints. If the tool is mounted in a fixture in the form of a robot arm, $E_{operator}$ can be interpreted as the energy transferred to the fixture.

$\dot{\theta}$ in FIG. 9 defines the angle velocity with which the operator's 12 hand and arm and also the tool 6 turn about the axis 10 when tightening the fastener 1.

The following relationships will be defined:

$$E_{target} = \frac{(T_{target})^2}{2 * k_j} \quad \text{(f3)}$$

$k_j$ is a measured value from joint characteristics achieved from a number of test runs or pilot samplings and depends on the stiffness of the joint. $k_j$ may also be achieved from measures during tightening of the fastener 1.

$$E_{joint} = \frac{T^2}{2 * k_j} \quad \text{(f4)}$$

$$E_{rot} = \frac{J * \dot{\varphi}_m^{*2}}{2} \quad \text{(f5)}$$

J is the inertia of the motor 7 and the gear 8 and $\dot{\phi}_m$ is the motor angle velocity.

$$E_{error} = i_q * k_m * (\phi_{target} - \phi_j) * N \quad \text{(f6)}$$

$i_q$ is the current which regulates to the motor 7, $k_m$ is a torque constant in the motor 7, $\phi_{target}$ is an estimated angle for which the fastener 1 should be tightened in the joint and $\phi_j$ is the actual angle for which the fastener 1 is tightened in the joint. N is the gear ratio of the gear 8 of the tool 6. The product of $i_q$ and $k_m$ gives the motor torque. The relation $(\phi_{target} - \phi_j) * N$ gives the remaining motor angle $\phi_m$ to reach the $\phi_{target}$.

Since $$i_q = \frac{E_{error}}{k_m * (\varphi_{target} - \varphi_j) * N}$$

and $T = k_j * \phi_j$
the following equation is achieved from the relationships above:

$$i_q = \frac{E_{error}}{k_m * N * \left(\frac{T_{target} - T}{k_j}\right)} \quad \text{(f7)}$$

T is the actual torque in the joint.

As a result the regulator 9 calculates an output signal $i_q$, which is dependant on the energy $E_{error}$ for braking the motor 7 of the tool 6.

Gsys in FIG. 9 is the transfer function for the system.

The above-mentioned relationships are also applicable to rivet joints. However, in case of rivet joints, $E_{target}$ and $E_{joint}$ above should be replaced by $E_{target\_rivet}$ and $E_{rivet}$, respectively according to:

$$E_{target\_rivet} = (F_{target})^2 / 2 * k_r \quad \text{(f8)}$$

$k_r$ is a measured value from joint characteristics achieved from a number of test runs or pilot samplings and depends on the stiffness of the joint. $k_r$ may also be achieved from measures during fastening of the rivet. $F_{target}$ is a predetermined target force for the rivet joint.

$$E_{rivet} = \frac{F^2}{2 * k_r} \quad \text{(f9)}$$

F is the actual force on the rivet joint.

$$F = k_e * \delta \quad \text{(f10)}$$

δ is the distance for compress the rivet.

The energy $E_{error}$ to brake the tool for riveting is the sum of the following energy contributions.

$$E_{error} = E_{target\_rivet} + E_{operator} - E_{rivet} - E_{rot} \quad \text{(f11)}$$

The invention claimed is:

1. A regulator for a power tool having a motor for tightening a fastener in order to unite two or more pieces into a joint,
   wherein said regulator regulates the power tool when tightening the fastener, so that the fastener is tightened to a predetermined target force ($F_{target}$),
   wherein the regulator regulates the power tool by calculating an output signal ($i_q$) to the power tool based on a calculated target energy ($E_{target\_rivet}$) that is required to reach the target force ($F_{target}$), and by increasing or decreasing a speed of the motor of the power tool during tightening of the fastener in accordance with the calculated output signal ($i_q$),
   wherein the target energy ($E_{target\_rivet}$) that is required to reach the target force ($F_{target}$) depends on a measured value ($k_r$) of a stiffness of the joint, and the regulator calculates the target energy ($E_{target\_rivet}$) for a soft or hard joint according to the equation:

$$E_{target\_rivet} = \frac{(F_{target})^2}{2 * k_r} \quad \text{(f8)}$$

wherein the measured value ($k_r$) of the stiffness of the joint is measured during tightening of the fastener, and
   wherein the measured value ($k_r$) of the stiffness of the joint is measured according to the equation:

$$k_r = F/\delta,$$

where F is an actual force in the joint, and δ is an actual traveled distance by which the fastener is compressed in the joint.

2. A regulator for a power tool having a motor for tightening a fastener in order to unite two or more pieces into a joint,
   wherein said regulator regulates the power tool when tightening the fastener, so that the fastener is tightened to a predetermined target torque ($T_{target}$),
   wherein the regulator regulates the power tool by calculating an output signal ($i_q$) to the power tool based on a calculated target energy ($E_{target}$) that is required to reach the target torque ($T_{target}$), and by increasing or decreasing a speed of the motor of the power tool during tightening of the fastener in accordance with the calculated output signal ($i_q$),
   wherein the target energy ($E_{target}$) that is required to reach the target torque ($T_{target}$) depends on a measured value ($k_j$) of a stiffness of the joint, and the regulator calculates the target energy ($E_{target}$) for a soft or hard joint according to the equation:

$$E_{target} = \frac{T_{target}^2}{2 * k_j}, \quad \text{(f3)}$$

wherein the measured value ($k_j$) of the stiffness of the joint is measured during tightening of the fastener, and
   wherein the measured value ($k_j$) of the stiffness of the joint is measured according to the equation:

$$k_j = T/\phi_j,$$

where T is an actual torque in the joint, and $\phi_j$ is an actual angle by which the fastener is tightened in the joint.

3. The regulator according to claim 2, wherein a braking energy ($E_{error}$), which is an amount of energy the motor needs to add in order to reach the target torque ($T_{target}$) follows the relationship:

$$E_{error} = E_{target} + E_{operator} - E_{joint} - E_{rot} \quad \text{(f2)}$$

where $E_{target}$ is the target energy required to reach the target torque ($T_{target}$),
   where $E_{operator}$ is a kinetic energy from an operator handling the power tool,
   where $E_{joint}$ is a potential energy in the joint, and
   where $E_{rot}$ is a kinetic rotational energy of the motor.

4. The regulator according to claim 3, wherein the output signal ($i_q$) from the regulator is dependent on a torque constant ($k_m$) in the motor of the power tool, the measured value ($k_j$) of the stiffness of the joint ($k_j$) and a gear ratio (N) of a gear of the power tool according to the equation:

$$i_q = \frac{E_{error}}{k_m * N * \left(\frac{T_{target} - T}{k_j}\right)}. \quad \text{(f7)}$$

where T is the actual torque in the joint.

5. The regulator according to claim 3, wherein the output signal ($i_q$) is calculated based on the braking energy ($E_{error}$).

6. The regulator according to claim 2, wherein a potential energy in the joint ($E_{joint}$) depends on the actual torque (T) in the joint exerted by the power tool on the fastener and the measured value ($k_j$) of the stiffness of the joint, so that the potential energy in the joint ($E_{joint}$) is compensated for a soft or hard joint according to the equation:

$$E_{joint} = \frac{T^2}{2 * k_j}. \quad \text{(f4)}$$

7. The regulator according to claim 2, wherein a kinetic rotational energy ($E_{rot}$) of the motor depends on an inertia (J) of the motor and of a gear of the power tool, and on a motor angle velocity ($\dot{\phi}_m$), according to the equation:

$$E_{rot} = \frac{J * \dot{\varphi}_m^2}{2}. \quad \text{(f5)}$$

8. The regulator according to claim 2, wherein a kinetic energy ($E_{operator}$) from an operator handling the power tool is dependent on the operator.

* * * * *